Patented Jan. 10, 1928.

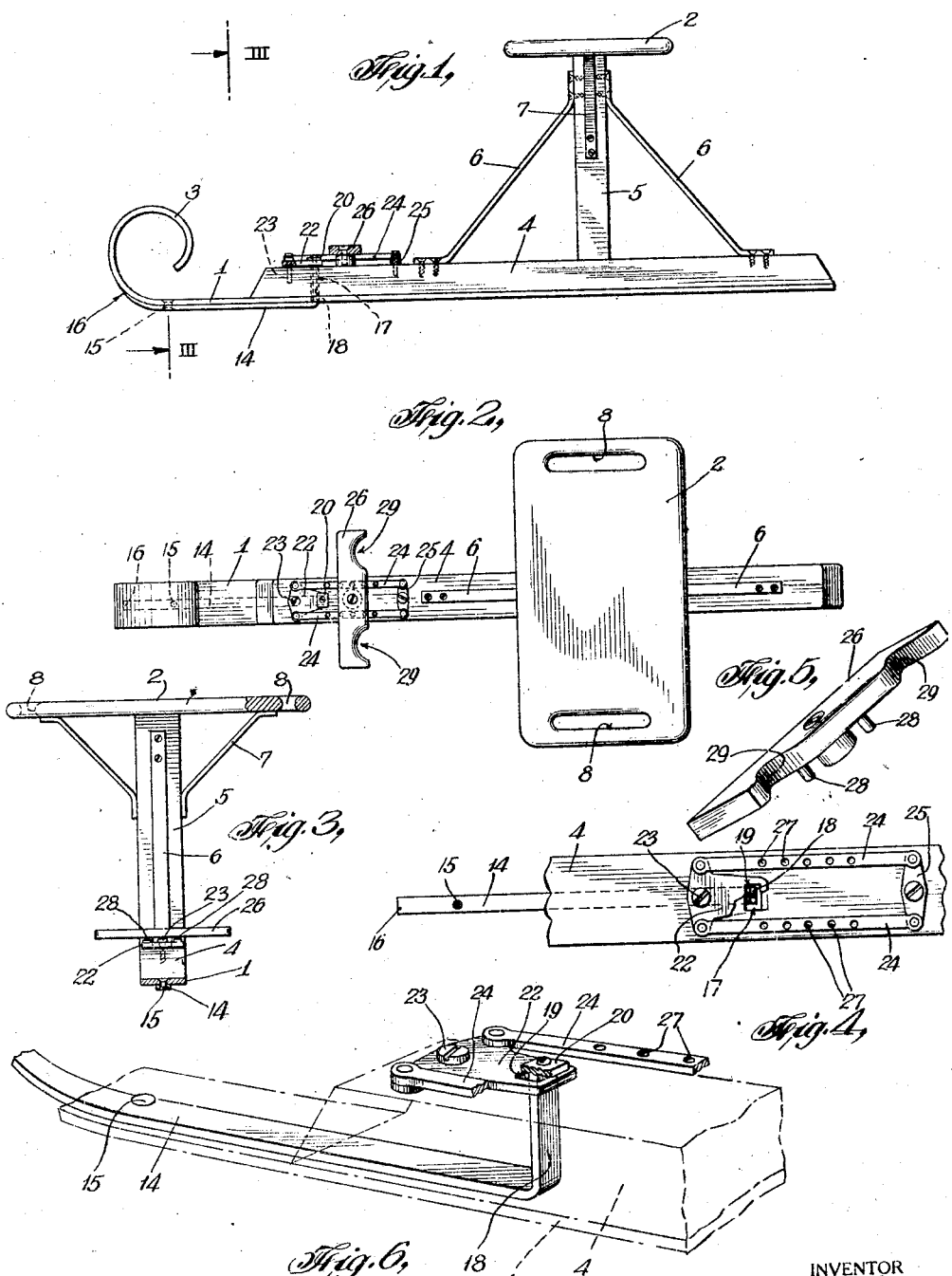

1,655,713

UNITED STATES PATENT OFFICE.

ADDISON B. SCOVILLE, OF MOUNT VERNON, NEW YORK.

SLED.

Application filed June 18, 1926. Serial No. 116,779.

My invention contemplates a sled for sporting or pleasure purposes, such as for coasting. In addition to the runner or runner means for supporting the rider or load, there is a supplemental runner for guiding purposes. The invention specially contemplates a single-runner sled in contradistinction to the usual parallel-runner sled.

The invention is embodied in the sled illustrated in the accompanying drawings.

Figure 1 is a side elevation of the sled; Figure 2 is a plan view thereof; Figure 3 is a front elevation, the runner being shown in section at line III—III of Figure 1; Figure 4 is a plan view of a detail partly in section; Figure 5 is a perspective of the pedal, and Figure 6 is a perspective of the supplemental or guiding runner and a part of the control means therefor, adjacent parts of the sled being shown in broken lines.

In the sled illustrated, the main or load supporting runner is illustrated at 1, and a rest, in this case a seat for the rider is shown at 2. The runner 1 is intended to be of great enough length and width to support the load on the snow or ice which, concisely, can be called the bearing surface. It will usually be curved upwardly at the forward end in accordance with the practice in sleds, and further for ornamental purposes, if desired, as indicated at 3. The runner 1 may be of any suitable material, wood or metal for example. When the runner is made of iron or a mild steel, it is usually made relatively thin as indicated in the drawing, and in order to prevent it bending immediately underneath the load I usually add a longitudinal strengthening member 4 on which I mount the rest and the steering mechanism hereafter described. Thus the seat 2 is mounted on a vertical post 5 rising from the beam 4 and braced at 6. The seat itself is braced at 7 from the post 5. Hand holes or depressions 8 may be provided in the ends of the seat 2 if desired.

The steering or guiding runner is illustrated at 14 and is in the form of a relatively thin and relatively narrow member shorter than the main runner 1, the forward end of which is pivoted at 15 to the forward end of the main runner. It may lie underneath and be supported by the main runner 1 substantially adjacent the medial line of the latter. The forward end of the guiding runner 14 may be curved upwardly as indicated at 16 in Figure 1 so as to slip over the ice or snow without undue interference. Adjacent the movable or rear end of the guiding runner 14, the main runner 1 and beam 4 are provided with a transverse opening 17 and through its opening rises a member 18 fastened to or integral with the rear end of the guiding runner. By means of this riser, the rear end of the guiding runner 14 is moved transversely of the main runner 1, on the pivot 15, at the will of the rider for guiding purposes.

In order to permit the rider to actuate the riser 18 conveniently, I attach a three-armed crank 22 to the beam 4 by means of the pivot bolt 23. The riser 18 may extend through an opening 19 in the crank 22 and receive a cap 20 as illustrated particularly in Fig. 6. From the free arms of the crank 22 extend the parallel bars 24 to a supporting member 25 also pivoted at beam 4. A pedal 26 is attached to the parallel bars. The connection of the pedal 26 to the parallel bars 24 are pivot connections, and for convenience of adjustment to suit the size or inclination of the rider I usually provide the bars 24 with a number of pairs of circular holes 27 and the pedal 26 with two corresponding circular pins 28 which, if desired, may be semi-permanently fastened in place in the parallel bars in an obvious way. By this arrangement the rider can adjust the pedal 6 to a position closer to or more remote from the seat 2 as will be apparent. The two ends of the pedal 26 may be recessed as indicated at 29 to receive the feet of the rider and a circular block underneath the pedal (as shown) will support the down-thrust.

The operation will be apparent from the foregoing description. The load or rider sitting on the seat 2 is supported by the relatively wide runner 1 bearing on the ice or snow. The rider, with his feet resting on the pedal 26, can move the steering runner 14 transversely of the main runner 1 as conditions may require and thus guide the sled as he will.

It will be understood that my invention is not limited to the details of construction illustrated and described, except as appears in the following claims:

1. A sled having a single runner for supporting the load, a rest for the rider thereon, a supplemental runner extending lengthwise of the load supporting runners adjacent the medial line of the latter, one end of the supplemental runner being fixed and the other end being movable transversely of the load supporting runner, a member, fixed to the movable end of the supplemental runner, rising through the load supporting runner, and means, operable by the rider, for moving said member transversely of the load supporting runner and thereby moving the movable end of the supplemental runner for guiding purposes.

2. The combination of claim 1 characterized by the last mentioned means comprising a crank pivoted to the structure of the load supporting runner and having an arm connected to said rising member, parallel bars connected to the crank to turn the same, and a pedal connected to the bars.

3. A sled having a single relatively-rigid load-supporting runner, a supplemental runner, extending below the load-supporting runner and extending lengthwise of the load-supporting runner adjacent the medial line of the latter, one end of said supplemental runner being fixed and its other end being movable transversely of the load-supporting runner, and a member fixed to said supplemental runner and extending upwardly through the load-supporting runner for moving the movable end of the supplemental runner transversely.

In testimony whereof, I have signed this specification.

ADDISON B. SCOVILLE.